US010460456B2

(12) United States Patent
Xie et al.

(10) Patent No.: US 10,460,456 B2
(45) Date of Patent: Oct. 29, 2019

(54) MOTION DETECTION OF OBJECT

(71) Applicant: Microsoft Technology Licensing, LLC, Redmond, WA (US)

(72) Inventors: Wenxuan Xie, Beijing (CN); Cuiling Lan, Beijing (CN); Wenjun Zeng, Beijing (CN)

(73) Assignee: Microsoft Technology Licensing, LLC, Redmond, WA (US)

(*) Notice: Subject to any disclaimer, the term of this patent is extended or adjusted under 35 U.S.C. 154(b) by 50 days.

(21) Appl. No.: 15/342,070

(22) Filed: Nov. 2, 2016

(65) Prior Publication Data

US 2017/0169574 A1 Jun. 15, 2017

(30) Foreign Application Priority Data

Dec. 10, 2015 (CN) .......................... 2015 1 0919394

(51) Int. Cl.
*G06K 9/00* (2006.01)
*G06T 7/254* (2017.01)

(52) U.S. Cl.
CPC .......... *G06T 7/254* (2017.01); *G06K 9/00342* (2013.01); *G06K 9/00771* (2013.01);
(Continued)

(58) Field of Classification Search
CPC ............. H04N 5/91; H04N 5/144–147; H04N 7/0137; H04N 7/18;
(Continued)

(56) References Cited

U.S. PATENT DOCUMENTS 4,746,910 A 5/1988 Pfister et al.
5,455,561 A 10/1995 Brown
(Continued)

FOREIGN PATENT DOCUMENTS

CN 1885346 A 12/2006
CN 101221663 A 7/2008
(Continued)

OTHER PUBLICATIONS

Kameda, et al., "A Human Motion Estimation Method using 3-Successive Video Frames", In the International Conference on Virtual Systems and Multimedia, Jan. 31, 1996, pp. 135-140, 5 pages.
(Continued)

*Primary Examiner* — Jose L Couso

(57) ABSTRACT

In implementations of the subject matter described herein, a current captured frame of a video is compared with a respective reference frame to determine a correlation therebetween. The correlation is used to indicate a change degree of the current frame. If the correlation for the current frame is below a predetermined threshold, the current frame may not be directly determined as including a motion of an object. Instead, correlations between one or more frames before or after the current frame and their respective reference frames are took into account. If the correlations of the frames under consideration are below the predetermined threshold, it may be detected that the current frame includes a motion of an object. In this way, incorrect detection of the object motion is reduced in the cases when larger changes in frames of a video are caused by factors such as noise and error, and the accuracy of the object motion detection is improved.

20 Claims, 5 Drawing Sheets

(52) U.S. Cl.
CPC .............. *G06T 2207/10016* (2013.01); *G06T 2207/10024* (2013.01); *G06T 2207/30232* (2013.01)

(58) Field of Classification Search
CPC ... H04N 13/0472–0484; H04N 19/142; H04N 19/179; H04N 19/87; G06T 7/2033; G06T 7/254; G06T 7/215; G06T 7/246; G06T 7/292; G06T 7/11; G06T 7/33; G06T 7/194; G06T 2207/10016; G06T 2207/10032; G06T 2207/30232; G08B 13/196–19613; G08B 13/19645; G08B 13/19663; G08B 13/19673; G06K 9/00771; G06K 9/00543; G06K 9/00758; G06K 9/00765; G06K 9/38; G06K 9/6857; G06K 9/6277; G06K 9/00335–00355; G06K 9/00778; G06F 17/30799

See application file for complete search history.

(56) References Cited

U.S. PATENT DOCUMENTS

| | | | |
|---|---|---|---|
| 5,937,092 | A | 8/1999 | Wootton et al. |
| 6,462,774 | B1 | 10/2002 | Bildstein |
| 6,493,041 | B1* | 12/2002 | Hanko .................. H04N 5/144 348/169 |
| 7,006,128 | B2 | 2/2006 | Xie et al. |
| 7,161,152 | B2 | 1/2007 | DiPoala |
| 7,486,827 | B2 | 2/2009 | Kim |
| 7,620,266 | B2 | 11/2009 | Brown et al. |
| 7,801,330 | B2 | 9/2010 | Zhang et al. |
| 7,917,393 | B2 | 3/2011 | Valdes et al. |
| 8,094,936 | B2 | 1/2012 | Woo et al. |
| 8,305,447 | B1 | 11/2012 | Wong |
| 8,571,261 | B2 | 10/2013 | Gagvani et al. |
| 8,744,123 | B2 | 6/2014 | Bobbitt et al. |
| 10,140,827 | B2* | 11/2018 | Laska ................. G06K 9/00771 |
| 2004/0086193 | A1* | 5/2004 | Kameyama ........... G06T 3/4053 382/254 |
| 2004/0239762 | A1* | 12/2004 | Porikli ..................... G06K 9/32 348/169 |
| 2006/0182368 | A1 | 8/2006 | Kim |
| 2007/0058837 | A1* | 3/2007 | Boregowda ............. G06T 7/223 382/103 |
| 2008/0170751 | A1* | 7/2008 | Lei .......................... G06T 7/215 382/103 |
| 2014/0198257 | A1 | 7/2014 | Gagvani et al. |
| 2015/0206014 | A1* | 7/2015 | Wu ......................... G08G 1/168 348/149 |
| 2016/0092727 | A1* | 3/2016 | Ren .................... G06K 9/00369 382/103 |
| 2016/0171311 | A1* | 6/2016 | Case .................. G06K 9/00771 382/103 |
| 2016/0307424 | A1* | 10/2016 | Mills .................... G08B 17/125 |
| 2017/0178352 | A1* | 6/2017 | Harmsen ................ G06T 7/579 |
| 2017/0374334 | A1* | 12/2017 | Frigo ...................... H04N 9/73 |
| 2018/0033152 | A1* | 2/2018 | Chen .................. G06K 9/00711 |
| 2019/0012761 | A1* | 1/2019 | Risinger ................... G06T 1/20 |

FOREIGN PATENT DOCUMENTS

| | | |
|---|---|---|
| CN | 103208126 A | 7/2013 |
| KR | 101537282 B1 | 7/2015 |
| WO | 1998028706 A1 | 7/1998 |
| WO | 0001140 A1 | 1/2000 |
| WO | 2013014578 A1 | 1/2013 |
| WO | 2014121340 A9 | 8/2015 |

OTHER PUBLICATIONS

Lavanya, et al., "Real Time Motion Detection Using Background Subtraction Method and Frame Difference", In the International Journal of Science and Research, vol. 3, Issue 6, Jun. 30, 2014, 5 Pages.

"International Search Report and Written Opinion Issued in PCT Application No. PCT/US2016/061291", dated Feb. 14, 2017, 15 Pages.

"Xiaomi Xiaoyi Mini Smart Monitor Infrared Night Version Small Ants Wireless Control Monitoring Webcam Real-time Two-way Voice Intercom Smart Home Security for iPhone Samsung Smartphone Tablet PC", Retrieved on: Dec. 1, 2015, 5 pages, Available at: http://www.amazon.com/Infrared-Wireless-Monitoring-Real-time-Smartphone/dp/B016UFGZUM.

"Nest Support", Retrieved on: Dec. 1, 2015, 2 pages, Available at: https://nest.com/support/article/How-does-Nest-Aware-improve-Nest-Cam-s-sound-and-motion-detection.

Woo, et al., "Environmentally Robust Motion Detection for Video Surveillance", In Journal of IEEE Transactions on Image Processing, vol. 19, No. 11, Nov. 2010, pp. 2838-2848.

Avgerinakis, et al., "Real Time Illumination Invariant Motion Change Detection", In Proceedings of the 18th ACM international conference on Multimedia, Oct. 25, 2010, 6 pages.

Yang, et al., "Online Learned Discriminative Part-based Appearance Models for Multi-Human Tracking", In Proceedings of 12th European conference on Computer Vision, Oct. 7, 2012, pp. 1-14.

Wang, et al., "Action Recognition by Dense Trajectories", In Proceedings of IEEE Conference on Computer Vision & Pattern Recognition, Jun. 20, 2011, pp. 3169-3176.

Tang, et al. "Learning Latent Temporal Structure for Complex Event Detection", In Proceedings of IEEE Conference on Computer Vision & Pattern Recognition, Jun. 16, 2012, pp. 1250-1257.

Cong, et al., "Sparse Reconstruction Cost for Abnormal Event Detection", In Proceedings of IEEE Conference on Computer Vision and Pattern Recognition, Jun. 20, 2011, pp. 3449-3456.

Barnich, et al., "ViBe: A Universal Background Subtraction Algorithm for Video Sequences", In Journal of IEEE Transactions on Image Processing, vol. 20, Issue 6, Jun. 2011, pp. 1-17.

St-Charles, et al., "SuBSENSE: A Universal Change Detection Method with Local Adaptive Sensitivity", in Journal of IEEE Transactions on Image Processing, vol. 24, Issue 1, Jan. 2015, pp. 359-373.

"First Office Action and Search Report Issued in Chinese Patent Application No. 201510919394.5", dated Jul. 2, 2019, 10 Pages. (W/O English translation).

\* cited by examiner

MOTION DETECTION OF OBJECT

BACKGROUND

At present, video surveillance is applied widely in smart home systems and security monitoring systems, for example. In the systems related to video surveillance, motion detection is an important task. The motion detection task usually involves detecting a motion of an object (such as a human being, an animal or the like) in the collected video content and sending an alarm to the user based on the detecting result. For example, a surveillance camera with a motion detection function may be installed in a house and activated after the resident leaves the house. Once a person is detected to attempt to break into the house, the surveillance camera may detect that there is a motion of an object in the video image and then send an alarm to the handheld device of the resident via a communication network, so that the resident can be aware of this situation. The performance of the video surveillance system mainly depends on the accuracy of the motion detection.

SUMMARY

In accordance with implementations of the subject matter described herein, a motion detection scheme is provided. A current captured frame of a video is compared with a respective reference frame to determine a correlation therebetween. The correlation is used to indicate a change degree of the current frame. If the correlation for the current frame is below a predetermined threshold, the current frame may not be directly determined as including a motion of an object. Instead, correlations between one or more frames before or after the current frame and their respective reference frames are took into account. If the correlations of the frames under consideration are below the predetermined threshold, it may be detected that the current frame includes a motion of an object. In this way, incorrect detection of the object motion is reduced in the cases when large changes in frames of a video are caused by factors such as noise and errors, and the accuracy of the object motion detection is improved.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

The subject matter described herein will now be discussed with reference to several example implementations. It should be understood these implementations are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes, but is not limited to." The term "or" is to be read as "and/or" unless the context clearly indicates otherwise. The term "based on" is to be read as "based at least in part on." The term "one implementation" and "an implementation" are to be read as "at least one implementation." The term "another implementation" is to be read as "at least one other implementation." The terms "first," "second," and the like may refer to different or the same objects. Other definitions, explicit and implicit, may be included below.

Figure 1:
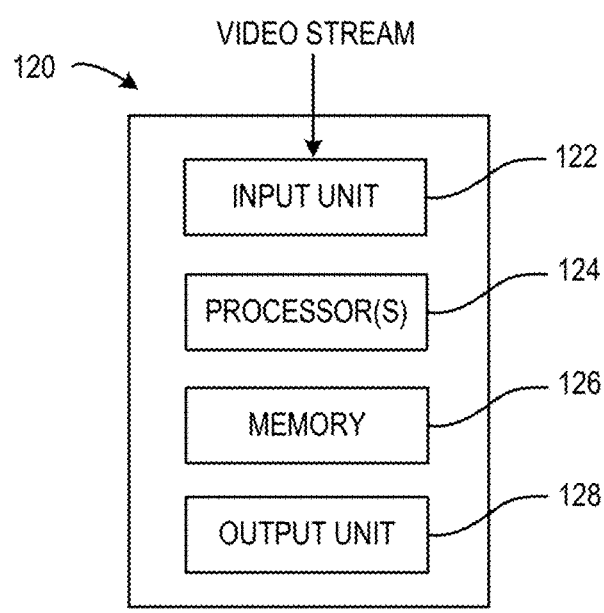
FIG. 1 illustrates a block diagram of a device suitable for implementing various implementations of the subject matter described herein.

FIG. 1 illustrates a block diagram of a device 120 suitable for implementing various implementations of the subject matter described herein. As shown, the device 120 comprises an input unit 122, at least one processor 124, at least one memory 126, and an output unit 128. An interconnection mechanism (not shown) such as a bus, a controller or a network interconnects of the parts of the device 120.

The input unit 122 may include circuitry for receiving from external devices input data, such as radio frequency (RF) receivers formed from one or more integrated circuits, transceivers, power amplifier circuitry, low-noise input amplifiers, inactive RF components, one or more antennas, and other circuitry for processing RF radio signals. The input unit 122 may further include keyboards, a mouse, joysticks, click wheels, scrolling wheels, a touch screen, touch sensors, and other equipment for gathering input from a user or other external sources.

The output unit 128 may include circuitry for transmitting to external devices output data, such as radio frequency (RF) transmitters formed from one or more integrated circuits, transceivers, power amplifier circuitry, low-noise input amplifiers, inactive RF components, one or more antennas, and other circuitry for processing RF radio signals. The output unit 128 may further include a display screen, sensors, vibrators, video components such as microphones and speakers, status-indicator lights, tone generators, and other equipment for generating output for the user or for external devices.

The processor 124 executes computer-executable instructions and may be a real or a virtual processor. In a multi-processing system, multiple processors execute computer-executable instructions to increase processing power. The processor 124 may be used to execute various appropriate actions and processing depending on programs stored in the memory 126 to control operations of the device 120. The processor 124 may include a general-purpose processor, a dedicated processor, one or more microprocessors, a microcontroller, a digital signal processor, base band processor integrated circuitry, dedicated integrated circuitry, a graphic processor, and the like. With one suitable arrangement, the processor 124 may be used to run software on the device 120 such as an operating system function, software implementing functions associated with gathering and processing video data, software associated with implementing motion detection, and the like.

The memory 126 may include one or more different types of storage such as hard disk drive storage, non-volatile memory (such as flash memory or other electrically-programmable-read-only memory), volatile memory (such as static or dynamic random access memory) and the like. The memory 126 may be used to store user input or text data, image data, or video data received from the input unit 122 and data required by the processor 124 to execute various processes.

The device 120 is any type of mobile, fixed, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, a wearable electronic device or any combination thereof, including the accessories and peripherals of these devices or any combination thereof.

The structure and function of the device 120 are described above only for the purpose of illustration without suggesting any limitations as to the scope of the subject matter described herein. The device 120 may include more components or less components than those shown in FIG. 1 or components different from those shown in FIG. 1. Different structures and/or functions can also realize the subject matter described herein.

The device 120 may be applied in video surveillance systems. In operation, the input unit 122 of the device 120 may receive video streams from a video capturing device installed in a specific scenario via wired or wireless connections. The video capturing device may include one or more video cameras for capturing video/images of the scenario. The video capturing device may be integrated into the device 120 or may be remote to the device 120. The received video data may be stored in the memory 126 or the external storage and processed by the processor 124 to detect whether it includes a motion of an object. A background frame, also called a background model, in the same scenario, may be maintained in the device 120, e.g., in the memory 126 of the device 120, or in the external storage of the device 120. The background frame usually includes stationary objects in that scenario such as buildings, streets, trees, walls, doors, windows, furniture, electrical appliances, and/or the like. Positions of these objects in the scenario may not be changed. In conventional motion detection methods, a given frame in the received video content is compared with the background frame to identify changes in the frame. Whether the frame includes a motion of an object is detected based on the identified changes. If a motion of an object is detected, the processor 124 of the device 120 may control the output unit 128 to output an alarm to the user or transmit the detecting result to other devices of the user for alarm.

The performance of a video surveillance system (for example, the system as shown in FIG. 1) mainly depends on the accuracy of the motion detection. To accurately detect the motion of the object in the video content is a basis of various subsequent processing tasks. Examples of these tasks may include but are not limited to user alarm, human detection/tracking, action recognition, event detection, and the like. The accuracy and effectiveness of the subsequent tasks may be significantly reduced by inaccuracy motion detection. For example, erroneous motion detection results will trigger tremendous alarms to be presented to the user, which will seriously affect the user experience.

In some cases, noise (including pixel-level noise and frame-level noise) introduced when the video capturing devices capture the video and sampling errors, frame errors and the like generated during the video processing might result in large difference between some frames and the background frame and thereby lead to the detecting result of there being a moving object in the scenario, even though no motion of the object is actually included in these frames. Most of the video surveillance systems identify the motion of an object with respect to each frame. Once it determines that the frame includes a motion of an object, an alarm will be sent to the user. Such motion detection process is sensitive to noise or errors in the video and cannot provide satisfying detection results.

In some other cases, erroneous motion detection results are due to incorrectly identifying a motion of an object in the frame. In the video surveillance, it is generally desirable to detect motion of opaque objects such as a human being, a machine, a vehicle or an animal. However, in addition to the moving objects, changes of environmental illumination conditions may also lead to changes of the frames, for example, changes of pixel values in the frames. The changes of illumination conditions may include global illumination changes or local illumination changes of the scenario, which may occur in cases when lights in the scenario are turned on or off, light intensity is adjusted, sunlight changes, a shadow is projected by an object outside the scenario, lights are shining from an illuminating object such as a car light outside the scenario. Most of the solutions which perform the motion detection based on the number of pixels with values changed will present erroneous detection results in the case that the frames only include changes of illumination intensity.

Detecting a moving object in a video is a technical problem that draws extensive concerns. To improve the accuracy of motion detection, it is desired to provide a solution that has higher robustness for noise and errors in the video and/or changes of environmental illumination intensity. According to various embodiments of the subject matter described herein, more accurate detection of moving objects is achieved.

Figure 2:
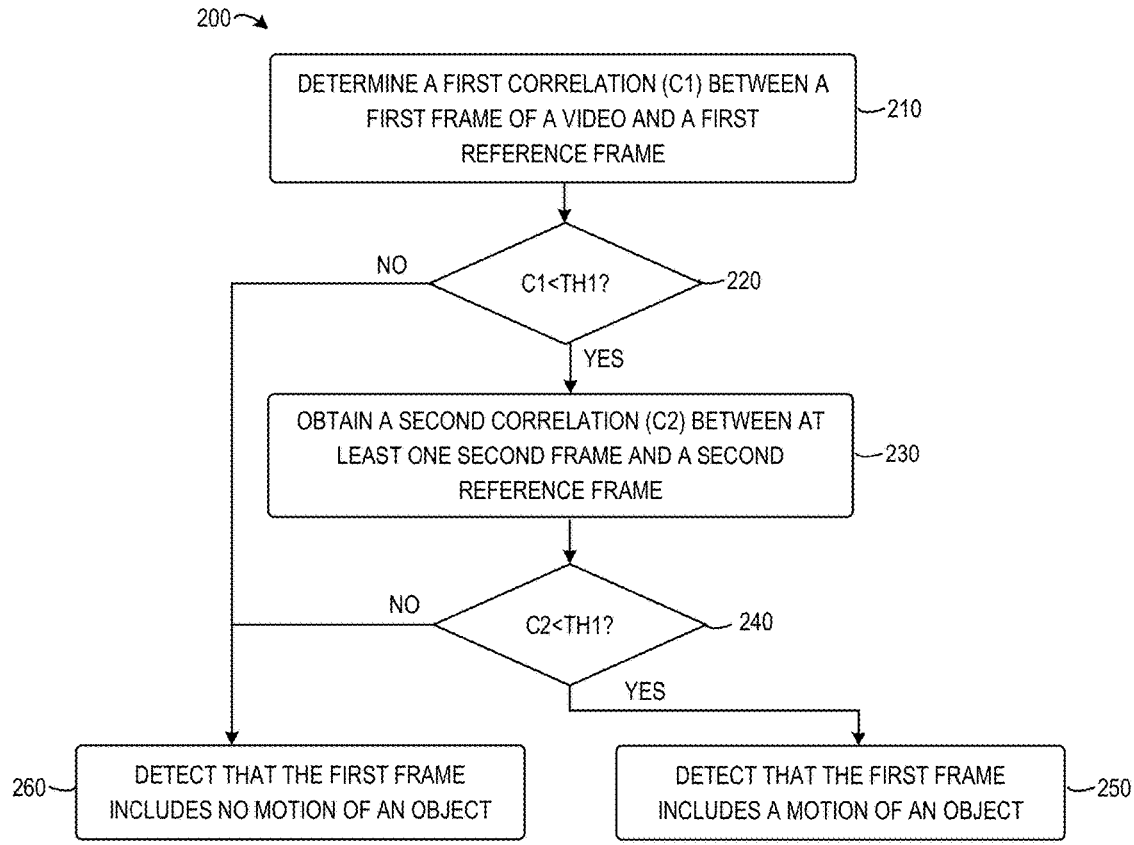
FIG. 2 illustrates a flow chart of a method of detecting a motion of an object in accordance with one implementation of the subject matter described herein.

FIG. 2 illustrates a flow chart of a method 200 of detecting a motion of an object in accordance with one implementation of the subject matter described herein. The method 200 may be implemented by the device 120 as shown in FIG. 1. Specifically, the method may be implemented by the processor 124 in conjunction with the memory 126 in the device 120.

In step 210, the device 120 determines a first correlation (represented by "C1") between a first frame of a video and a first reference frame. The video may be received from a video capturing device. In some implementations, the video capturing device may transmit in real time to the device 120 the video collected from a scenario in which the video capturing device is installed, for example through streaming transmission technology. Alternatively, it is also feasible to provide the collected video signal to the device 120 periodically, or store a segment of video in the device 120 one time. The device 120 may determine a corresponding correlation for each frame of the received video.

The first correlation C1 is used to indicate a change degree of the first frame. The first reference frame is used as a reference to reflect the change in the first frame. In some implementations, the first reference frame may be a predetermined background frame of the video. As mentioned above, the background frame includes stationary objects in the scenario. The computing device 120 may determine the first correlation C1 based on a difference between the first frame and the background frame so that the first correlation C1 can indicate a difference between the content in the first frame and the stationary background frame.

Alternatively, or in addition, the first reference frame may also be a frame adjacent to the first frame. The term "adjacent" used herein may refer to directly adjacent, or refer that there are other frame(s) between the two frames. Hence, in some implementations, the first reference frames may be one or more frames immediately before or after the first frame. For example, in an implementation where the computing device 120 receives the video stream for processing in real time, the first reference frames may be one or more frames before the first frame. In the case that the computing device 120 processes the pre-stored video, the first reference frames may be selected as one or more frames after the first frame. In this case, of course, one or more frames before the first frame may also be used as the reference frames. The computing device 120 may determine the first correlation C1 based on the difference between the first frame and the respective adjacent frames so that the first correlation C1 can indicate a change of the content in the first frame in a short period of time.

In some implementations, both the background frame and the adjacent frame are used as the first reference frames so as to give a better indication of the change of the current first frame with respect to the stationary background and in a period of time. In the case that a plurality of first reference frames, for example one or more background frames and one or more adjacent frames, are used, the computing device 120 may determine a corresponding first correlation C1 for each of the first reference frames. Determination of the correlation will be described in more detail below.

The device 120 may maintain the background frame(s) in the memory 126 or the external storage, for example. The background frames may be preconfigured and usually include stationary objects in the scenario where the video capturing device is installed. In some implementations, an image captured by the video capturing device upon initial running may be used as a background frame. The background frames may also be obtained in a way of capturing a plurality of frames, removing the areas of moving objects from these frames, and integrating the remaining backgrounds. Alternatively, or in addition, the user may control the capture of the background frames. The number of the background frames may be one or more.

In some implementations, one or more of the background frames may be updated by the device 120. Background frame (background model) updating methods, which are known currently or to be developed in the future, may be utilized. For example, the method of ViBe (Visual Background Extractor) may be used to create and update the background frames. Specifically, one or more pixels in the received new frame are used to randomly update corresponding pixels in the plurality of background frames. In another example, a received new frame may be used to replace the background frame which is collected at the earliest time among the plurality of background frames, namely, "the oldest" background frame. In some implementations, after the received frame is determined as not including a motion of an object, this frame is used to update the background frame. In some implementations, the updating frequency of the background frames is high. In this case, only the background frames, but not the frames adjacent to the first frame, are considered in determining the first correlation C1 because the background frame are closed enough to the first frame.

The first correlation C1 between the first frame and each of the first reference frames may be used as a basis for detecting whether the frame includes the motion of an object. If the first correlation C1 is high (for example, exceeds a first threshold Th1), this means that the change of the first frame is small and the possibility of this frame including the motion of the object is small. On the contrary, if the first correlation C1 is low (e.g., lower than the first threshold Th1), the first frame has a large change relative to the first reference frame (e.g., the background frame or the adjacent frame) so that the possibility of this frame including the motion of the object is large. However, since the first frame might include some noise and errors, determining existence of the moving objects only based on the first correlation C1 may result in the detection error, which in turn leads to errors of subsequent processing based on the detecting result. For example, false alarms may be caused to be sent to the user frequently, thereby troubling to the user.

According to implementations of the subject matter described herein, upon detecting whether the first frame includes the motion of an object, correlation of some frames adjacent to the first frame (before or after the first frame) are considered. If correlations between some frames adjacent to the first frame and their corresponding reference frames are also lower than, for example, the first threshold Th1, it may be determined that the first frame includes the motion of an object. In other words, in the case that low correlations are detected continuously in multiple frames or a certain period of time, the collected video can be determined as including the motion of the object, which is different from directly determining the first frame as having a moving object as in conventional solutions. If the changes of the frames collected previously are small, it may be determined that the first frame include no motion of object. In this way, incorrect detection of the object motion is reduced in the cases when large changes in frames of a video are caused by factors such as noise and errors, and the accuracy of the object motion detection is improved.

Specifically, in step 220 of the method 200, the device 120 determines whether the first correlation C1 is blow the first threshold Th1. In the case that the device 120 refers to a plurality of first reference frames, it may be determined whether the first correlations C1 between the first frame and most of the first reference frames (e.g., more reference frames than the number of a predetermined number threshold, or all the reference frames) are below the first threshold Th1. The first threshold Th1 may be set based on one or more of the following: frame resolution, a measure unit of the correlation, and the like. In some implementations, the first threshold Th1 may be reconfigured with the update of the first reference frames.

If the first correlation C1 is determined as exceeding the first threshold Th1 in step 220, the method 200 will proceed to step S260 where the device 120 detects that the first frame includes no motion of object. In the cases of multiple first reference frames, if the first correlations C1 between the first frame and a small number (smaller than a certain threshold) of first reference frames are determined as exceeding the first threshold Th1, the method 200 proceeds to step S260.

If the first correlation C1 is determined blow the first threshold Th1, the device 120 obtains a second correlation (represented as C2) between at least one second frame and a corresponding second reference frame in step 230. The second frame may include a plurality of successive frames before or after the first frame, or may be non-successive frames. For example, correlations of 20 successive second frames before the first frame may be used as a basis for the motion detection of the first frame. It is also feasible to refer to 20 non-successive frames among 50 frames before the first frame. Alternatively, or in addition, several frames after the first frame may be determined as the second frames so as to indicate that the change in the first frame is continuous or accidental. In some implementations, correlations for a plurality of frames which are determined may be buffered in the memory 126 or the external storage for use. The number of second frames that may be used as a reference for motion detection of the first frame may be preconfigured. Alternatively, a predetermined time period may be set, and the frames collected during this time period are used as a reference for the motion detection.

The second reference frame(s) of the second frame may be identical with the first reference frame(s), for example, may be the background frame(s) of the video. Similarly, the second reference frames may be alternatively or additionally selected as one or more frames adjacent to the second frame. The second correlations calculated based on the background frames and the adjacent frames may indicate the change degree of the second frame with respect to the stationary background and/or the adjacent frames.

In step 240, the device 120 determines whether the second correlation C2 is below the first threshold Th1. Similar to the first frame, if multiple second correlations C2 (i.e., the correlations between the second frame and a plurality of second reference frames) are stored for each second frame, it may determine whether one or more of these second correlations C2 are below the first threshold Th1. The second correlations C2 corresponding to each second frame may be compared with the first threshold Th1. If it is determined that the all or most of the correlations C2 of the referenced second frame are below the first threshold Th1, this means that the low correlation lasts for a period of time in the video, which may reduce the possibility of sudden changes in a certain frame or frames being caused by the noise or errors. Then, the device 120 determines, in step 250, that the current first frame in question is detected as including a motion of an object.

In some implementations, in response to detecting that the first frame includes the motion of an object, the device 120 may generate an alarm for the user so that the user can be aware of the motion of the object in the scenario monitored by the video capturing device. For example, the output equipment 128 of the device 120 may provide the user with an alarm in the format of text, video, audio, or indicator light. Alternatively, or in addition, the device 120 may transmit to other devices such detecting result that the motion of an object is determined, so as to alarm the user via the other devices. For example, in the case that the device 120 is fixed or not carried by the user, the device 120 may send an alarm signal to other devices as specified by the user. In some other implementations, the detection of a moving object may be further provided to other processing devices so as to perform additional processing for the video including the first frame. Examples of the additional processing may include but not limited to user alarm, human detection/tracking, action recognition, event detection and the like.

In some implementations, if the second correlation C2 is determined as exceeding the first threshold Th1 in step 240, for example, if the second correlations C2 associated with one or more frames of the referenced second frames exceed Th1, the device 120 detects that the first frame includes no motion of object in step 260. In this case, since there are not enough frames before the first frame whose correlations are below the first threshold Th1, even if the correlation C1 of the first frame is below the first threshold Th1, the first frame cannot be determined as including a motion of an object for the moment.

In some implementations, if the first correlation C1 of the first frame is determined below the first threshold Th1 in step 220, the device 120 may buffer the correlation C1 of the first frame in the memory 126 or the external storage as a reference for motion detection of subsequent frames. In some implementations, in order to save storage space, the correlation of a frame that is buffered for the longest period of time may be deleted from the memory 126 or the external storage. That is to say, correlations of a predetermined number of frames may be stored, and the stored correlations may be updated with an approach of first-input first-output.

Some implementations of determining that a frame of the video includes a motion of an object are discussed above. The method shown in FIG. 2 may start in a situation when a motion of an object is not detected in one or more frames before the device 120 receives the first frame. Erroneous determination of the object motion caused by noise or interference is reduced by taking into account some second frames before the first frame, thereby preventing over alert caused by frequent detection of the object motion. In some implementations, if the first frame has been detected as including the motion of the object, it is desired to, for frames after the first frame, use a stricter condition to restrict the detecting result from changing back to a state of no motion. This also aims to reduce potential erroneous detection due to existence of noise and errors in the frames of the video. The stricter condition may avoid frequent changes between a result of the motion of the object and a result of no motion of the object, which significantly avoids disturbing the user with tremendous alarms.

In some implementations, the device 120 may determine a third correlation (represented as "C3") between a third frame after the first frame and a corresponding reference frame. The third frame may be a frame received by the device 120 immediately after the first frame, or a frame received after a period of time. For example, if the device 120 is configured to perform motion detection for the input video stream after a period of time if detecting a motion of an object, the third frame may be a frame received when the motion detection restarts. Similar to the reference frame of the first and second frames, a third reference frame of the third frame may also include one or more background frames of the video or one or more frames adjacent to the third frame.

If the device 120 detects that the first frame includes the motion of an object, upon determining whether the subsequent third frame includes the motion of an object, the device 120 may use a larger threshold (for example, a second threshold Th2 larger than the first threshold Th1) to compare with the third correlation C3. The larger second threshold Th2 may cause the third frame to be more easily determined as including the motion of an object as compared with the first frame, and be more difficulty determined as not including the motion of an object. In this case, if the third correlation C3 is below the second threshold Th2, the device 120 continues to determine that the third frame includes the motion of an object. Hence, an alarm signal may be continued to be provided to the user. In the case where the third correlation C3 exceeds the second threshold Th2, the device 120 may determine that the third frame includes no motion of object, and thus may stop sending the alarm to the user. It is appreciated that in other implementations, for those frames after the first frame that are detected as including the motion of an object, the device 120 may use the same threshold correlation (namely, the first threshold Th1) to perform the motion detection.

Determination of the correlation of the frames in the video will now be discussed. The correlation determination procedure described here may be used to determine the correlation between any of the first, second, and third frames mentioned above and their corresponding reference frames. The correlation may be used to measure the differentiation degree between a given frame and the reference frame. Here, the reference frame may include one or more predetermined background frames, and/or one or more frames adjacent to the given frame.

In some implementations, by comparing the given frame with a background frame, the device 120 identifies a plurality of foreground pixels from pixels of the frame. This process may be referred to as background subtraction. Generally speaking, in the background subtraction, only the background frame other than the frame adjacent to the current frame is used for the comparing, so as to determine a change of this frame as compared with the stationary objects in the scenario. The identified foreground pixels are different from corresponding pixels in the background frame (namely, pixels located at the same position in a two-dimensional space of image). In an example, the device 120 may compare the pixel values of each pixel in the frame to be processed and the corresponding pixel in the background frame. If the difference between the pixel values is greater than the predetermined threshold, the pixels of the frame are identified as foreground pixels.

In some implementations, a size of the frame may be scaled to the identical size of the background frame, and then pixels in the two frames are compared one by one. For example, to save the storage space and improve the processing efficiency, the background frame may be compressed to a small size. Depending on the resolution of the video capturing device, the size of the collected frames may also be compressed or enlarged to match with that of the background frame. It will be appreciated that any other background subtraction methods that are known currently or to be developed in the future may be used to identify the foreground pixels. The image formed by the identified foreground pixels may be called a foreground map. In some implementations, a two-value Boolean image may be created as the foreground map based on the identifying results of the foreground pixels, and it has the same size as the corresponding frame. In this image, one value (e.g., "1") of the two values is used to identify the foreground pixels, and the other vale (e.g., "0") is used to identify the other pixels (which may also be referred to as background pixels). The device 120 may address the foreground pixels in the frame based on this Boolean image.

As discussed above, changes of the environmental illumination intensity in the scenario monitored by the video capturing device may also cause a difference between the captured frame and the reference frame. To differentiate the change of the illumination intensity in a frame of the video from the change caused by the object motion, in some implementations, the device 120 may determine the correlation between the frame and the reference frame based on intensity values of the foreground pixels. Specifically, the device 120 may determine intensity differences between the intensity values of the foreground pixels of the frame and intensity values of corresponding pixels in the reference frame, and then determine the correlation based on the intensity differences. In some implementations, the current frame and the reference frame may be scaled to the same sizes so as to facilitate the comparison of the intensity values. The device 120 may transform the current frame and the reference frame into a grayscale space to determine the intensity values of their pixels. In an example, the intensity differences may be determined as difference values between the intensity values of the foreground pixels and the intensity values of the corresponding pixels in the reference frame. In another example, an intensity difference may be a quotient between intensity values of two pixels. Alternatively, or in addition, the differences between pixel intensity values may be represented in other manners.

Many approaches may be used to determine a value of a correlation to measure the difference between the foreground pixels of the current frame and the corresponding pixels in the reference frame. In an example, the mean value and variance of the intensity difference values may be calculated, and the correlation may be determined based on the calculated mean value and variance, as well as the number of the foreground pixels. This may be expressed as follow:

$$C = \frac{\text{Mean}(Q)\sqrt{N}}{\text{Var}(Q)} \quad (1)$$

where C represents the correlation, N represents the number of the foreground pixels, $Q=\{q_i|i\in[1,N]\}$ represents an intensity difference sequence of N foreground pixels, which includes a value $q_i$ of the intensity difference corresponding to each foreground pixel, Mean(Q) represents the mean value of the intensity difference sequence Q, and Var(Q) represents the variance of the intensity difference sequence Q. The mean value Mean(Q) and variance Var(Q) may be calculated as follows based on their standard definitions:

$$\text{Mean}(Q) = \frac{1}{N}\sum_{i=1}^{N} q_i \quad (2)$$

$$\text{Var}(Q) = \frac{1}{N-1}\sum_{i=1}^{N} (q_i - \text{Mean}(Q))^2 \quad (3)$$

By determining the correlation between a given frame and a corresponding reference frame based on the intensity of the foreground pixels, a small correlation may be determined when the intensity differences of the foreground pixels and the corresponding pixels of the reference frame are large, for example, when the variance Var(Q) is large, and there is a high possibility that this frame is detected as including the motion of an object. If the intensity differences are small, this means that large changes will not occur with the intensity values of the foreground pixel of the frame. Therefore, the corresponding correlation is large and it is unlikely that the frame is detected as including the motion of an object.

Usually, if the frame includes the motion of an object, the object such as a human being or animal may have an appearance different from the stationary objects (such as a wall or street) included in the background frame. An image of a human being or animal has more texture. The texture of pixels in given positions in the frame of the video changes along with the motion of the object, but this change usually may not affect intensities of the pixels. Hence, the variance determined based on the pixel intensity values is large, and the resulting correlation is small so that it is easier to detect that the frame includes the motion of an object. If the frame does not include an actual object motion but has a change of the illumination intensity (for example, due to lights or shadows), the intensity values of the affected areas in the frame will be increased or decreased consistently, thereby generating a small change of intensity differences and a high correlation. In this case, the frame may be correctly determined as not including the motion of an object. This approach may reduce erroneous motion detection results caused in the cases where the change of the illumination intensity and the motion of an object cannot be differentiated.

Figure 3:
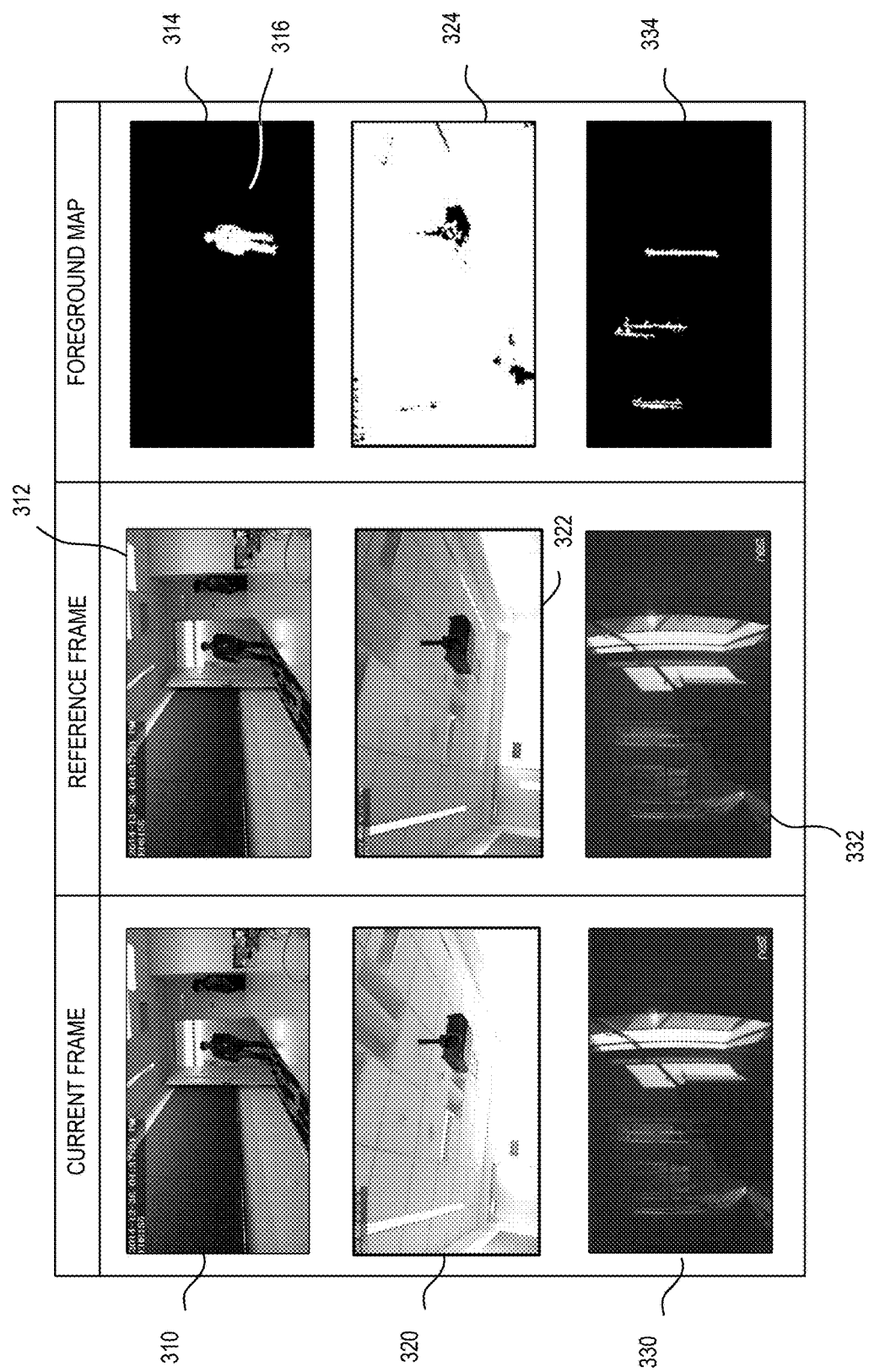
FIG. 3 illustrates schematic views showing comparisons between current frames, reference frames, and foreground maps in accordance with an implementation of the subject matter described herein.

FIG. 3 illustrates a schematic view showing comparisons between current frames, reference frames, and foreground maps in accordance with an implementation of the subject matter described herein. In the case that the current frame is an image indicated by 310, the reference frame 312 is a frame collected before the current frame 310. Compared to the reference frame 312, the frame 310 includes a motion of a human being, but the illumination condition in the scenario remains unchanged. The device 120 compares the frame 310 with a predetermined background frame (not shown) of this scenario and extracts a foreground map 314 from the frame 310. Foreground pixels in the foreground map 314 are concentrated in an area marked by 316. Based on the intensity values of the identified foreground pixels in the foreground map 314, the device 120 determines a correlation for the frame 310 and detects that the correlation is below for example the first threshold Th1. If the device 120 has determined that the second correlations C2 of a predetermined number of second frames before the frame 310 are also below the first threshold Th1, it may be correctly detect that the frame 310 includes the motion of an object.

In the case where the current frame is an image indicated by 320, a reference frame 322 is a background frame set in the current scenario. Compared to the reference frame 322, the frame 320 only includes a change of illumination intensity (for example, caused by increase of lighting intensity). The device 120 may similarly process the frame 320 and determine a foreground map 324 identified from the frame 320 relative to the background frame (namely, the frame 322). Then the device 120 determines a correlation between the frame 320 and the reference frame 322 based on the foreground map 324. Since intensity values of most of the foreground pixels in the frame 320 consistently become large due to the increase of the illumination intensity, the difference between these intensity values is small and thus the correlation determined by the device 120 is large (e.g., larger than the first threshold Th1). Therefore, the device 120 may correctly detect that the frame 320 includes no motion of object and will not provide erroneous judgment caused by the change of the illumination intensity in the scenario.

In the case where the current frame is an image denoted by 330, a reference frame 332 is a frame collected before the current frame 330. Similar to the scenario corresponding to the image 320, the frame 330 only includes a change of illumination intensity caused by a car light of a passing car outside the window and does not include the motion of an object. The device 120 may similarly determine a foreground map 334 identified from the frame 330 relative to a predetermined background frame (not shown) of this scenario, and the device 120 may detect that the frame 330 does not include the motion of an object based on the intensity values of the foreground pixels in the foreground map 334.

Alternatively, or in addition, in some implementations, the device 120 may further determine the correlation between a given frame and the reference frame based on color properties of the foreground pixels. In this case, the given frame and the reference frame may be processed in a color space to determine the color properties of the foreground pixels. Examples of the color space may include an HSI (hue, saturation, and intensity) space, a RGB (red, green, and blue) space, and the like. The color properties of the pixels may be determined and represented by one or two of hue values and saturation values. In some implementations, the device 120 may determine hue differences between hue values of the foreground pixels of the frame and corresponding pixels in the reference frame. Regarding the saturation values, saturation differences may also be determined similarly. Then, the device 120 may determine the correlation by combining the intensity differences and/or color differences. For example, the device 120 may determine correlations related to the hue differences and/or saturation differences in a manner similar to the correlation determination based on the intensity values as described above. Then, the correlation for the corresponding frame is determined based on a calculated sum of weights of the plurality of correlations.

In some implementations, a change of the frame of the video might not be embodied on a change of color (e.g., the hue values or saturation values). For example, if the environmental illumination intensity in the scenario is low or the video capturing device works in an infrared mode, the motion of an object in this scenario cannot be indicated effectively with colors. Hence, the environmental illumination intensity may be determined first before determining the factors for calculating the correlation. If the illumination intensity is low, the hue and saturation of the foreground pixels may be ignored and only the intensity values are taken into consideration. In some other implementations, to lower the computing complexity and improve the processing efficiency, the hue and/or saturation of the foreground pixels may also be ignored when determining the correlation.

In the above, whether a frame of the video includes the motion of an object is determined based on the correlation between this frame and the reference frame. Depending on the selection of the reference frames, the correlation may indicate a difference degree between a frame of the video and the background frames, or a difference degree between the frame and its adjacent frames. In some implementations, whether a frame of the video includes the motion of an object may also be determined based on the number of the foreground pixels. Since the foreground pixels are obtained based on the comparison of the frame and the background frames, the number of the foreground pixels may also indicate a difference degree between this frame and the background frame.

Figure 4:
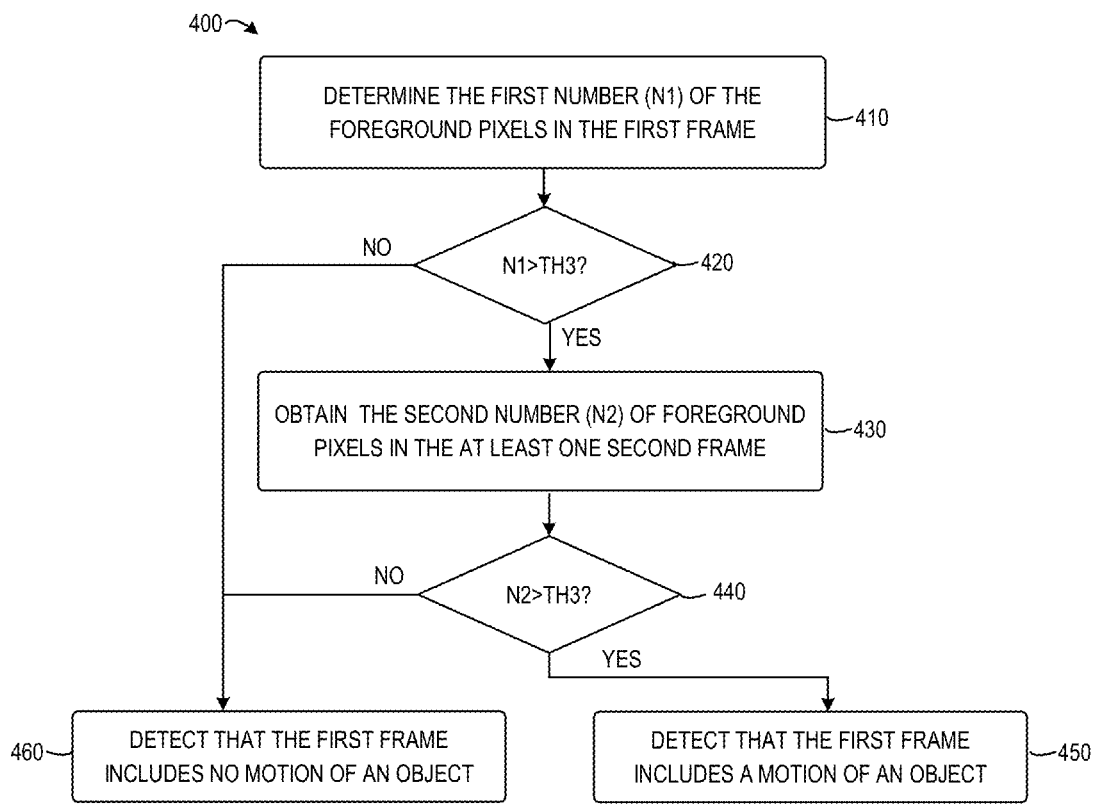
FIG. 4 illustrates a flow chart of a method of detecting a motion of an object in accordance with another implementation of the subject matter described herein.

FIG. 4 illustrates a flow chart of a method 400 of detecting a motion of an object in accordance with this implementation. The method may be implemented by the device 120 as shown in FIG. 1. Specifically, this method may be implemented by the processor 124 in conjunction with the memory 126 in the device 120. In this method 400, the device 120 determines whether a frame received from for example a video capturing device includes a motion of an object. The method 400 is similar to method 200, and the difference lies in that the number of foreground pixels in the frame is used as a basis for determination in the method 400. For simplicity, the following description will focus on the difference between the method 400 and method 200.

In step 410, the device 120 determines the first number (represented as "N1") of the foreground pixels in the first frame. The identification of the foreground pixels has been discussed above. The device 120 may determine the number of the identified foreground pixels. In the case where there are multiple background frames, a first number N1 of the foreground pixels in the foreground map of the first frame relative to each of the background frames may be determined.

In step 420, the device 120 determines whether the first number N1 exceeds a third threshold Th3. As mentioned above, the foreground pixels in the first frame are different from the corresponding pixels in the background frame. In some implementations, the larger the number of the foreground pixels is, the larger the difference between the first frame and the background frame is. On the contrary, the smaller the number of the foreground pixels is, the higher a similarity between the first frame and the background frame is. If multiple background frames are used and a plurality of first numbers N1 are calculated, the device 120 may determine whether most (for example, exceeding a certain threshold) of the first numbers N1 are greater than the third threshold Th3. The third threshold Th3 may be set in relation to the resolution of the referenced background frame(s) and the first frame. In some implementations, the third threshold Th3 may be configured anew as the background frame is updated.

If the first number N1 determined by the device 120 in step 420 is lower than the third threshold Th3, the first frame is detected as not including the motion of an object in step 460. In the case that the device 120 maintains a plurality of background frames and derives a plurality of first numbers N1, if not most of the first numbers ((e.g., less than a certain threshold) is determined as being below the third threshold Th3 in step 420, the method 400 proceeds to step 460.

If the first number N1 is determined as exceeding the third threshold Th3 in step 420, to avoid influence of noise and errors in the first frame, the device 120 further refers to the numbers (represented as "N2") of the foreground pixels in one or more second frames before the first frame. As shown in FIG. 4, the device 120 obtains a second number of foreground pixels in the second frame in step 430. In some implementations, the numbers of the foreground pixels in one or more frames are buffered in the memory 126 or the external storage. The number of the second frames considered in performing the motion detection for the first frame may be preconfigured. Alternatively, a predetermined time period may be set, and the numbers of foreground pixels in those frames collected during this time period may be used as a reference for the motion detection.

Then, in step 440, the device 120 determines whether the second number N2 exceeds the third threshold Th3. Similar to the first frame, if for each second frame, multiple second numbers N2 (i.e., the numbers of the foreground pixels in the second frame relative to a plurality of background frames) are stored, it may determine whether one or more of these second numbers N2 are below the third threshold Th3. If it is determined that all or most of the numbers N2 of the foreground pixels of the referenced second frames are higher than the third threshold Th3, this means that the high number for the foreground pixels lasts for a period of time in the video, and there are large changes in multiple frames of the video. Hence, the possibility of sudden changes in a certain frame or frames being caused by the noise or errors may be reduced. Then, the device 120 determines, in step 450, that the first frame in question is detected as including a motion of an object. Furthermore, in response to this detecting result, the device 120 may provide an alarm to the user.

In some implementations, if the second number N2 is determined below the third threshold Th3 in step 440, for example, if the numbers of foreground pixels of most of the considered second frames are low, the method 400 proceeds to step 460 where the device 120 determines that the first frame includes no motion of object.

In some implementations, if the first number N1 of the foreground pixels in the first frame is determined below the third threshold Th3 in step 420, in a similar manner of buffering the correlation of the first frame, the device 120 may also buffer the number of the foreground pixels to the memory 126 or a connectable external storage to serve as a reference for the motion detection of subsequent frames of the video.

In the implementations of determining the motion of the object based on the number of the foreground pixels discussed above with reference to FIG. 4, the method 400 may start in a situation when a motion of an object is not detected in one or more frames before the device 120 receives the first frame. If the device 120 has detected the motion of the object in the first frame, it is desired to, for frames after the first frame, use a stricter condition to restrict the detecting result from changing back to a state of no motion, thereby preventing over alert caused by noise and errors.

In some implementations, the device 120 may determine a third number (represented as "N3") of the foreground pixels in a third frame after the first frame. When determining whether the third frame includes the motion of an object, the device 120 may use a smaller threshold (for example, a fourth threshold Th4 less than the third threshold Th3) to compare with the third number N3. The smaller fourth threshold Th4 may cause the third frame to be more easily determined as including the motion of an object as compared with the first frame, and more difficulty determined as not including the motion of an object. If the third number N3 exceeds the fourth threshold Th4, the device 120 may continue to determine the third frame includes the motion of an object and continue to provide an alarm to the user. When the third number N3 is below the fourth threshold Th4, the device 120 may determine that the third frame includes no motion of object, and thus may stop sending the alarm to the user. It is appreciated that in other implementations, for those frames after the first frame that are detected as including the motion of an object, the device 120 may use the same threshold number for the foreground pixels (namely, the third threshold Th3) to perform the motion detection.

In some implementations, the method 400 and method 200 may be separately used to detect a given frame. In other implementations, the motion detection based on the number of the foreground pixels proposed in method 400 may be used in conjunction with the motion detection based on the correlation as proposed in method 200 to determine whether a given frame includes a motion of an object. In the implementations where the method 400 is used in conjunction with the method 200 to perform the motion detection, if the device 120 determines that the first correlation C1 of the first frame is smaller than the first threshold Th1 and the first number N1 of the foreground pixels is greater than the third threshold Th3, the first frame may be detected as including a motion of an object only if the correlation and the number of foreground pixels in the previous referenced second frame also satisfy their corresponding conditions. Otherwise, it may be determined that the first frame includes no motion of object. In the case where the motion of the object is not considered, the first frame may only have a change relative to the reference frame in terms of illumination intensity, or have no motion of the object or no change of the illumination intensity.

As can be seen from the motion detection described above with reference to the method 200 of FIG. 2 and/or the method 400 of FIG. 4, for a given frame, the device 120 may determine three detection results: (1) the frame include no motion of object (corresponding to a state of no motion); (2) the frame includes a motion of an object (corresponding to a state of motion of interest); (3) the frame is used as a candidate frame (corresponding to a state of candidate motion), where the frame of the video cannot be determined as including a motion of an object for the moment, and the correlation and/or the number of foreground pixels of this frame need to be buffered. As mentioned previously, such state of candidate motion may facilitate reduction of erroneous detection caused by noise and errors of the video. When performing detection for the video, the device 120 may switch between the three states and present a detection result for each frame.

Figure 5:
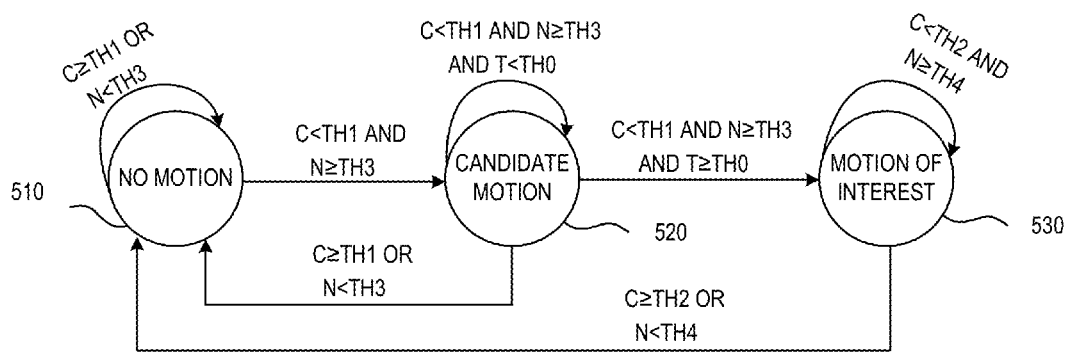
FIG. 5 illustrates a schematic view of a state transition mechanism between states corresponding to three detection results in accordance with one implementation of the subject matter described herein.

FIG. 5 illustrates a schematic view of a state transition mechanism between the states corresponding to three detection results. In the example of FIG. 5, the state transition is shown based on both the correlation (denoted by C) and the number of foreground pixels (denoted by N) of a given frame captured by the video capturing device. In other examples, the state transition may be determined only based on the correlation C or only base on the number N of the foreground pixels.

As shown, when the motion detection for the video starts at the very beginning or when it has been detected that the previous frames include no motion of object, a detection result of the video is in a state of no motion 510. If the correlation C of a received frame is greater than or equal to the first threshold Th1 or the number of foreground pixels N is below the third threshold Th3, the device 120 determines that the video is still in the state of no motion 510. If the correlation C is smaller than the first threshold Th1 and the number of the foreground pixels N is greater than or equal to the third threshold Th3, the device 120 determines to switch the video to a state of candidate motion 520. The device 120 will stay in the state 520 for a period of time T, and this period of stay time may be a predetermined period of time or a time duration corresponding to a predetermined number of frames.

If the correlations C of the frames received in the following time period T are still smaller than the first threshold Th1 and the numbers of their foreground pixels N are still greater than the third threshold Th3, the device 120 switches to a state of motion of interest and determines that the frame received at this time includes a motion of an object. That is to say, the device 120 may also maintain a threshold (denoted a threshold Th0) corresponding to the time period T of staying in the state of candidate motion. The time period T may be accumulated from the moment when the first frame is detected with C smaller than Th1 and N greater than Th3. The time period T may be accumulated in response to detecting that the correlations C of one or more received frames are smaller than Th1 and the numbers of their foreground pixels N are greater than Th3. If the time period T is greater than the threshold Th0, the state of candidate motion 520 may be switched to the state of motion of interest 530. If, during accumulation of the time period T, the correlation C of the frame under detection is greater than the threshold Th1 or the number of its foreground pixels N is less than Th3, the state of candidate motion 520 may be switched to the state of no motion 510.

When the device 120 determines that the video is in the state of motion of interest 530, the device 120 may restrict from switching from the state 530 to the state 510, by using a stricter condition. Specifically, the device 120 uses a second threshold Th2 that is greater than the first threshold Th1 to determine whether the correlations C of the subsequent frames satisfy the condition, and uses a fourth threshold Th4 that is smaller than the third threshold Th3 to determine whether the numbers of foreground pixels of the subsequent frames satisfy the condition. If the correlations C are smaller than the second threshold Th2 and the numbers of the foreground pixels N are greater than the fourth threshold Th4, the device 120 will still remain in the state 530. If the correlations C are greater than the second threshold Th2 or the numbers of the foreground pixels N are smaller than the fourth threshold Th4, the device 120 determines switching from the state 530 to the state 510.

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Some exemplary implementations of the subject matter described herein are listed as follows:

In one aspect, the subject matter described herein discloses a method. The method comprises determining a first correlation between a first frame of a video and a first reference frame. The method further comprises, in response to the first correlation being below a first threshold, determining whether a second correlation between at least one second frame before the first frame and a second reference frame is below the first threshold; and detecting whether the first frame includes a motion of an object at least in part based on the determination that the second correlation is below the first threshold.

In some implementations, the method further comprises, in response to determining that a third correlation between a third frame after the first frame and a third reference frame is below a second threshold, detecting that the third frame includes a motion of an object, the second threshold being larger than the first threshold.

In some implementations, the method further comprises, in response to detecting that the first frame includes a motion of an object, generating an alarm for a user.

In some implementations, the determining the first correlation comprises: identifying a plurality of foreground pixels from pixels in the first frame by comparing the first frame and a background frame of the video, the foreground pixel being different from a corresponding pixel in the background frame; and determining the first correlation based on intensity values of the identified foreground pixels.

In some implementations, the determining the first correlation based on intensity values of the identified foreground pixels comprises: determining intensity differences between the intensity values of the foreground pixels in the first frame and intensity values of corresponding pixels in the first reference frame; and determining the first correlation based on the intensity differences.

In some implementations, the determining the first correlation comprises: obtaining color properties of the foreground pixels, the color properties including at least one of the following: hue values and saturation values; and determining the first correlation further based on the intensity values of the foreground pixels and the color properties of the foreground pixels.

In some implementations, the method further comprises, in response to a first number of the foreground pixels in the first frame exceeding a third threshold, determining whether a second number of foreground pixels in the at least one second frame exceeds the third threshold. In some implementations, the detecting in the method comprises: in response to determining that the second correlation is below the first threshold and the second number exceeds the third threshold, detecting that the first frame includes a motion of an object.

In some implementations, the method further comprises, in response to determining that a third number of foreground pixels in a fourth frame after the first frame exceeds a fourth threshold, detecting that the fourth frame includes a motion of an object, the fourth threshold being smaller than the third threshold.

In another aspect, there is provided a device. The device comprises at least one processor; and at least one memory. The at least one memory includes computer program code, the at least one memory and the computer program code are configured to, with the at least one processor, cause the device to: determine a first correlation between a first frame of a video and a first reference frame, in response to the first correlation being below a first threshold, determine whether a second correlation between at least one second frame and a second reference frame is below the first threshold, and detect whether the first frame includes a motion of an object at least in part based on the determination that the second correlation is below the first threshold.

In some implementations, the at least one memory and the computer program code are further configured to, with the at least one processor, cause the device to: in response to determining that a third correlation between a third frame after the first frame and a third reference frame is below a second threshold, detect that the third frame includes a motion of an object, the second threshold being larger than the first threshold.

In some implementations, the at least one memory and the computer program code are further configured to, with the at least one processor, cause the device to: in response to detecting that the first frame includes a motion of an object, generate an alarm for a user.

In some implementations, the at least one memory and the computer program code are further configured to, with the at least one processor, cause the device to: identify a plurality of foreground pixels from pixels in the first frame by comparing the first frame and a background frame of the video, a foreground pixel being different from a corresponding pixel in the background frame; and determine the first correlation based on intensity values of the identified foreground pixels.

In some implementations, the at least one memory and the computer program code are further configured to, with the at least one processor, cause the device to: determine intensity differences between the intensity values of the foreground pixels in the first frame and intensity values of corresponding pixels in the first reference frame; and determine the first correlation based on the intensity differences.

In some implementations, the at least one memory and the computer program code are further configured to, with the at least one processor, cause the device to: obtain color properties of the foreground pixels, the color properties including at least one of the following: hue values and saturation values; and determine the first correlation further based on the intensity values of the foreground pixels and the color properties of the foreground pixels.

In some implementations, the at least one memory and the computer program code are further configured to, with the at least one processor, cause the device to: in response to a first number of the foreground pixels in the first frame exceeding a third threshold, determine whether a second number of foreground pixels in the at least one second frame exceeds the third threshold; and in response to determining that the second correlation is below the first threshold and the second number exceeds the third threshold, detect that the first frame includes a motion of an object.

In some implementations, the at least one memory and the computer program code are further configured to, with the at least one processor, cause the device to: in response to determining that a third number of foreground pixels in a fourth frame after the first frame exceeds a fourth threshold, detect that the fourth frame includes a motion of an object, the fourth threshold being smaller than the third threshold.

In some implementations, the device further comprises: a receiver configured to receive the video from a remote video capture device.

In a further aspect, there is provided a computer program product, comprising a computer program tangibly embodied on a machine readable medium, the computer program including program code for performing a process comprising steps of: determining a first correlation between a first frame of a video and a first reference frame; in response to the first correlation being below a first threshold, determining whether a second correlation between at least one second frame and a second reference frame is below the first threshold; and detecting whether the first frame includes a motion of an object at least in part based on the determination that the second correlation is below the first threshold.

In some implementations, the computer program further includes program code for performing a process comprising steps of: in response to determining that a third correlation between a third frame after the first frame and a third reference frame is below a second threshold, detecting that the third frame includes a motion of an object, the second threshold being larger than the first threshold.

In some implementations, the computer program further includes program code for performing a process comprising steps of: in response to detecting that the first frame includes a motion of an object, generating an alarm for a user.

In some implementations, the computer program further includes program code for performing a process comprising steps of: identifying a plurality of foreground pixels from pixels in the first frame by comparing the first frame and a background frame of the video, the foreground pixel being different from a corresponding pixel in the background frame; and determining the first correlation based on intensity values of the identified foreground pixels.

In some implementations, the computer program further includes program code for performing a process comprising steps of: determining intensity differences between the intensity values of the foreground pixels in the first frame and intensity values of corresponding pixels in the first reference frame; and determining the first correlation based on the intensity differences.

In some implementations, the computer program further includes program code for performing a process comprising steps of: obtaining color properties of the foreground pixels, the color properties including at least one of the following: hue values and saturation values; and determining the first correlation further based on the intensity values of the foreground pixels and the color properties of the foreground pixels.

In some implementations, the computer program further includes program code for performing a process comprising steps of: in response to a first number of the foreground pixels in the first frame exceeding a third threshold, determining whether a second number of foreground pixels in the at least one second frame exceeds the third threshold. In some implementations, the detecting in the method comprises: in response to determining that the second correlation is below the first threshold and the second number exceeds the third threshold, detecting that the first frame includes a motion of an object.

In some implementations, the computer program further includes program code for performing a process comprising steps of: in response to determining that a third number of foreground pixels in a fourth frame after the first frame exceeds a fourth threshold, detecting that the fourth frame includes a motion of an object, the fourth threshold being smaller than the third threshold.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method comprising:
receiving, by a video surveillance device, a first frame of a video and at least one second video frame of the video;
identifying, by the video surveillance device, a plurality of foreground pixels from pixels in the first frame;
determining, by the video surveillance device, a first correlation between the first frame of the video and a first reference frame based on intensity values of the identified foreground pixels;
in response to the first correlation being below a first threshold, by the video surveillance device, determining whether a second correlation between at least one second frame of the video and a second reference frame is below the first threshold; and
detecting, by the video surveillance device, whether the first frame of the video includes a motion of an object at least in part based on the determination that the second correlation is below the first threshold.

2. The method of claim 1, further comprising:
in response to determining that a third correlation between a third frame after the first frame and a third reference frame is below a second threshold, detecting that the third frame includes a motion of an object, the second threshold being larger than the first threshold.

3. The method of claim 1, further comprising:
in response to detecting that the first frame includes a motion of an object, generating an alarm for a user.

4. The method of claim 1, wherein determining the first correlation based on intensity values of the identified foreground pixels comprises:
determining intensity differences between the intensity values of the foreground pixels in the first frame and intensity values of corresponding pixels in the first reference frame; and
determining the first correlation based on the intensity differences.

5. The method of claim 1, wherein determining the first correlation comprises:
obtaining color properties of the foreground pixels, the color properties including at least one of the following: hue values and saturation values; and
determining the first correlation further based on the intensity values of the foreground pixels and the color properties of the foreground pixels.

6. The method of claim 2, further comprising:
in response to a first number of the foreground pixels in the first frame exceeding a third threshold, determining whether a second number of foreground pixels in the at least one second frame exceeds the third threshold, and wherein the detecting comprises:
in response to determining that the second correlation is below the first threshold and the second number exceeds the third threshold, detecting that the first frame includes a motion of an object.

7. The method of claim 6, further comprising:
in response to determining that a third number of foreground pixels in a fourth frame after the first frame exceeds a fourth threshold, detecting that the fourth frame includes a motion of an object, the fourth threshold being smaller than the third threshold.

8. A video surveillance device for use with at least one video capturing device, the video surveillance device comprising:
   at least one processor; and
   at least one memory including computer program code, the at least one memory and the computer program code are configured to, with the at least one processor, cause the device to:
      receive a first frame of a video and at least one second video frame of the video,
      identify a plurality of foreground pixels from pixels in the first frame,
      determine a first correlation between the first frame of the video and a first reference frame based on intensity values of the identified foreground pixels,
      in response to the first correlation being below a first threshold, determine whether a second correlation between at least one second frame of the video and a second reference frame is below the first threshold, and
      detect whether the first frame of the video includes a motion of an object at least in part based on the determination that the second correlation is below the first threshold.

9. The video surveillance device of claim 8, wherein the at least one memory and the computer program code are further configured to, with the at least one processor, cause the device to:
   in response to determining that a third correlation between a third frame after the first frame and a third reference frame is below a second threshold, detect that the third frame includes a motion of an object, the second threshold being larger than the first threshold.

10. The video surveillance device of claim 8, wherein the at least one memory and the computer program code are further configured to, with the at least one processor, cause the device to:
   in response to detecting that the first frame includes a motion of an object, generate an alarm for a user.

11. The video surveillance device of claim 8, wherein the at least one memory and the computer program code are further configured to, with the at least one processor, cause the device to:
   determine intensity differences between the intensity values of the foreground pixels in the first frame and intensity values of corresponding pixels in the first reference frame; and
   determine the first correlation based on the intensity differences.

12. The video surveillance device of claim 8, wherein the at least one memory and the computer program code are further configured to, with the at least one processor, cause the device to:
   obtain color properties of the foreground pixels, the color properties including at least one of the following: hue values and saturation values; and
   determine the first correlation further based on the intensity values of the foreground pixels and the color properties of the foreground pixels.

13. The video surveillance device of claim 8, wherein the at least one memory and the computer program code are further configured to, with the at least one processor, cause the device to:
   in response to a first number of the foreground pixels in the first frame exceeding a third threshold, determine whether a second number of foreground pixels in the at least one second frame exceeds the third threshold; and
   in response to determining that the second correlation is below the first threshold and the second number exceeds the third threshold, detect that the first frame includes a motion of an object.

14. The video surveillance device of claim 13, wherein the at least one memory and the computer program code are further configured to, with the at least one processor, cause the device to:
   in response to determining that a third number of foreground pixels in a fourth frame after the first frame exceeds a fourth threshold, detect that the fourth frame includes a motion of an object, the fourth threshold being smaller than the third threshold.

15. The video surveillance device of claim 8, further comprising:
   a receiver configured to receive the video from a remote video capture device.

16. A method comprising:
   receiving, by a video surveillance device, a first frame of a video and at least one second video frame of the video;
   identifying, by the video surveillance device, a plurality of foreground pixels from pixels in the first frame;
   determining, by the video surveillance device, a first correlation between the first frame of the video and a first reference frame based on intensity values of the identified foreground pixels;
   in response to the first correlation being below a first threshold, by the video surveillance device, determining whether a second correlation between at least one second frame of the video and a second reference frame is below the first threshold;
   detecting, by the video surveillance device, whether the first frame of the video includes a motion of an object at least in part based on the determination that the second correlation is below the first threshold; and
   in response to determining that a third correlation between a third frame after the first frame and a third reference frame is below a second threshold, detecting that the third frame includes a motion of an object, the second threshold being larger than the first threshold.

17. The method of claim 16, further comprising:
   in response to a first number of the foreground pixels in the first frame exceeding a third threshold, determining whether a second number of foreground pixels in the at least one second frame exceeds the third threshold, and
   wherein the detecting comprises:
      in response to determining that the second correlation is below the first threshold and the second number exceeds the third threshold, detecting that the first frame includes a motion of an object.

18. The method of claim 16, further comprising:
   in response to detecting that the first frame includes a motion of an object, generating an alarm for a user.

19. The method of claim 16, further comprising:
   determining intensity differences between the intensity values of the foreground pixels in the first frame and intensity values of corresponding pixels in the first reference frame; and
   determining the first correlation based on the intensity differences.

20. The method of claim 16, further comprising:
   obtaining color properties of the foreground pixels, the color properties including at least one of the following: hue values and saturation values; and determining the first correlation further based on the intensity values of the foreground pixels and the color properties of the foreground pixels.

* * * * *